United States Patent [19]
Credner et al.

[11] 4,369,243
[45] Jan. 18, 1983

[54] PHOTOGRAPHIC RECORDING MATERIAL FOR DIFFUSION PROCESSES AND USEFUL NON-DIFFUSING SULFILIMINE COMPOUNDS

[75] Inventors: Hans-Heinrich Credner, Hohenschaeftlarn; Wolfgang Lässig, Munich; Karl-Wilhelm Schranz, Odenthal-Hahnenberg, all of Fed. Rep. of Germany

[73] Assignee: Agfa-Gevaert Aktiengesellschaft, Leverkusen, Fed. Rep. of Germany

[21] Appl. No.: 241,255

[22] Filed: Mar. 6, 1981

[51] Int. Cl.$^3$ ....................... G03C 5/54; G07C 49/62; G09B 53/00

[52] U.S. Cl. .................................... 430/223; 430/241; 430/242; 430/505; 430/554; 430/561; 430/562

[58] Field of Search ............... 430/223, 505, 218, 222, 430/241, 242, 559, 561, 562

[56] References Cited

U.S. PATENT DOCUMENTS

| | | | |
|---|---|---|---|
| 3,980,479 | 9/1976 | Fields et al. | 430/222 |
| 4,199,354 | 4/1980 | Hinshaw et al. | 430/222 |

FOREIGN PATENT DOCUMENTS 4399 9/1979 European Pat. Off. .

*Primary Examiner*—John E. Kittle
*Assistant Examiner*—John L. Goodrow
*Attorney, Agent, or Firm*—Connolly and Hutz

[57] ABSTRACT

Sulfilimine compounds of formula I

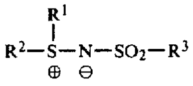

in which $R^3$ is the residue of a diffusible photographically active compound can be split reductively to release the residue together with a group $—SO_2—NH_2$. When $R^3$ represents the radical of a dye or dye precursor the sulfilimines are useful as color providing compounds in dye diffusion transfer processes.

13 Claims, No Drawings

PHOTOGRAPHIC RECORDING MATERIAL FOR DIFFUSION PROCESSES AND USEFUL NON-DIFFUSING SULFILIMINE COMPOUNDS

This invention relates to a photographic recording material comprising at least one silver halide emulsion layer containing at least one non-diffusing compound which through a reduction reaction, foams a diffusible, photographically active compound, more particularly a diffusible dye for diffusion transfer processes.

The production of photographic images, particularly dye images, by diffusion transfer processes has been known for a long time, for example the production of so-called instant color images. The photographic recording materials used for this purpose are, in principle, similar in structure insofar as they contain at least one photosensitive silver halide emulsion layer and an image receiving layer. The dye image is produced by incorporating, in the material non-diffusing color providing compounds from which, after various chemical reactions, soluble or diffusible dyes or dye precursors originate in image distribution. The diffusible dyes or dye precursors thus formed migrate into the image receiving layer where they are fixed to form the dye image.

Since the dye image obtained in the image-receiving layer is generally intended to be a positive image of the original or of the subject which has been photographed, the composition of the photographic recording material has to be such that formation of the image is accompanied by a reversal. The reversal may take place either during exposure by using a positive silver halide emulsion or during the image-wise formation of the dye by making use of suitable chemical color providing systems.

In view of the different silver halide emulsions which may be used for dye transfer processes, photographic dye transfer materials may be divided into two groups, namely those in which positive silver halide emulsion layers are used and others which contain negative silver halide emulsion layers.

In cases where positive silver halide emulsions are used, it is necessary to employ dye systems of the type which release a diffusible dye image-wise at the exposed areas in proportion to the progress of the photographic development. Compounds suitable for this purpose are the so-called DDR-compounds. Dye-forming systems of this type are described in British Pat. No. 904,364; U.S. Pat. Nos. 3,227,550; 3,628,952; 3,844,785 and German Offenlegungsschriften Nos. 2,317,134 and 2,415,125. Using photographic materials of this type, it is possible to produce colored transfer images of considerable quality. Nevertheless, materials and processes of the type in question are attended by certain disadvantages, for example a relatively long development time and unsatisfactory stability of the dye images formed.

For photographic dye transfer materials of the other type which contain one or more negative silver halide emulsion layers it is necessary to use those coloring systems which lead to a reversal of the image, i.e. initially non-diffusing color providing compound should form, through the development reaction taking place during development of the exposed silver halide emulsion layer or through a resultant reaction, a diffusible dye or dye precursor at the unexposed areas which diffuses into the image receiving layer where it forms a positive dye image of the original.

Color providing compounds of this type are, for example, the so-called dye developer compounds. These compounds are soluble and diffusible at alkaline pH-values of the type which apply during photographic development. In the areas where development takes place, they react with the developer oxidation products and are thus converted into a non-diffusing form. Compounds of this type are described, for example, in U.S. Pat. No. 2,983,606 or U.S. Pat. No. 3,185,567.

Other coloring systems are based on non-diffusing oxidizable color providing compounds which bring about a reversal of the image during release of the dye and which may therefore be used in combination with negative silver halide emulsions. Compounds such as these are initially contained in non-diffusing form in the silver halide emulsion layer or in an adjacent layer. Because of their chemical consititution, they are split up hydrolytically to form a diffusible dye at the alkaline pH-values of the photographic development process. This cleavage reaction only takes place in the unexposed areas because, in the exposed areas, the compounds are oxidized by the developer oxidation product and are thus converted into a non-cleavable form. Compounds of this type are described in German Offenlegungsschriften Nos. 2,402,900; 2,543,902 and 2,823,159.

Numerous advantages can be obtained with color-providing compounds of this type which, through their ballast groups, are initially incorporated in non-diffusing form in the photographic material. The compounds described in German Offenlegungsschrift No. 2,402,900 are compounds of the type which split off diffusible photographically active compounds, particularly dyes or dye precursors, by a so-called intramolecular nucleophilic displacement reaction.

Another coloring system which leads to image reversal and which may therefore be combined with negative silver halide emulsions is formed by non-diffusing reducible color providing compounds. These compounds, through substitution with ballast groups, are present in the form of non-diffusing oxidized compounds or, more generally, in the form of reducible compounds. They react neither directly nor indirectly with oxidizing substances, for example the developer oxidation product, so that resistance to diffusion in the exposed areas cannot be influenced. However, they are reactive towards reducing compounds, for example through direct or preferably indirect reaction with unused photographic developer which is available in the unexposed areas. In consequence of the reduction these compounds are split in such a way that they release a diffusible, photographically active compound, particularly a compound forming a dye or dye precursor, which subsequently diffuses into and is fixed in the image receiving layer.

In a particularly preferred embodiment, the last mentioned compounds are used in combination with an electron donor precursor compound (ED-precursor compound) which provides the electrons required for the dye-releasing reaction. If, therefore, an ED-compound or ED-precursor compound is present in imagewise distribution in the photographic material containing the non-diffusing reducible color providing compounds, diffusible photographically active compounds are released by the reaction of the ED-compound with the non-diffusing color providing compound, so that the diffusible, photographically active compounds, particularly dyes, are formed in the same imagewise distribution.

The reducible compounds afford various advantages over the oxidizable compounds which lie above all in the fact that the release of the diffusible photographically active compounds can be better controlled, thereby allowing color separation to be improved and the formation of undesirable color fog to be suppressed. Nevertheless, it is desirable further to improve the properties of coloring systems of this type which work positively in combination with negative silver halide emulsions. If it is considered that formation of the diffusible dye has to be preceded by a number of chemical reactions, namely the photographic development reaction and the reaction of the photographic developer via the ED-compounds of ED-precursor compounds with the color providing compound incorporated in non-diffusing form, some of these reactions being relatively complicated, and if it is further considered that the various reactions have to take place immediately after one another to prevent the formation of diffusible dye in unwanted areas, it will be appreciated that as mucz latitude as possible is required, particularly in regard to the choice of the various reaction components.

Another difficulty lies in the fact that the compounds required for the various reactions mentioned have to be able to be incorporated very easily into photographic layers in order not to complicate production of the photographic material. In addition, the compounds required for the reaction are of course required to be sufficiently stable. In particular, the dyes released are required to be extremely fast to light.

Since some of the compounds involved in the above mentioned reaction have a relatively complicated chemical structure, it is also desirable to improve the existing systems and to replace them by others which are easier to obtain in terms of chemical production.

The object of the present invention is to find new cleavable compounds and to provide photographic materials containing these new cleavable compounds. The new compounds are intended to be able to be cleaved by reduction and to be able to be incorporated in the photographic material in non-diffusing form through the installation of a ballast group. In addition, they are intended to contain the essential part of a photographically active molecule, preferably a dye molecule, and to have such a structure that, after cleavage, the photographically active molecule becomes diffusible whilst the rest of the molecule together with the ballast group remains in non-diffusing form in the layer in which the uncleaved cleavable compound was incorporated.

The reductive cleavage mechanism characteristic of the new compounds may be defined by the expression "CR-compound" (Cleavage by Reduction). Accordingly, this expression is used hereinafter.

The CR-compounds differ from the reducible color providing compounds mentioned above as explained in the following. The earlier mentioned compounds have first to be reduced and may then be hydrolysed by $\beta$-cleavage. The resultant dependence upon the pH-value may lead to disadvantages. By contrast, the CR-compounds used according to the invention have the advantage that cleavage actually takes place through the reaction with the ED-compounds so that there is no need for subsequent hydrolysis.

Accordingly, the photographic recording material according to the invention is characterized by the presence of a non-diffusing compound which is capable of a reductive cleavage reaction with the release of a diffusible, photographically active compound, particularly a dye. It is particularly preferred to use the CR-compounds according to the invention in combination with an ED-compound or an ED-precursor compound, the ED-compounds distributed image-wise supplying the CR-compound according to the invention with electrons and thereby initiating the reductive cleavage reaction in which the photographically active diffusible compound is released imagewise.

The new cleavage mechanism, i.e. the reductive cleavage reaction, characteristic of the new compounds used in accordance with the invention has the major advantage that it makes it possible for the mechanism by which the release of the photographically active compound is controlled to be considerably better influenced. This cleavage mechanism, or rather the mechanism by which the photographically active compound is released, functions with particularly advantage in combination with organic reducing agents. The photographically active compounds, particularly dyes, to be released are split off with the $NH_2$—$SO_2$-groups which have already proved to be effective in photographic transfer processes of the type in question. The combination with these organic reducing agents, i.e. with ED-compounds or ED-precursor compounds, makes it possible for the reaction velocities of the component reactions involved in the overall reaction chain to be influenced in a way which has not hitherto been possible, and promotes the formation of relatively larger quantities of the required diffusible photographically active compound, particularly a diffusible dye.

The electron-accepting CR-compounds cleavable by reduction which may be used in accordance with the invention may in principle be characterized by the following schematic structure:

(ballasted carrier)—(cleavable bond)—(diffusible group)

A "ballasted carrier" is understood to be that part of a molecule to which the diffusible group is bonded through the cleavable bond and which renders the compound incorporated in the photographic material resistant to diffusion, even under alkaline development conditions. In general, the carrier contains long-chain alkyl groups.

The chemical structure of the so-called ballast groups in the non-diffusing compounds containing the photographically active group is not critical per se. The photographically active group preferably contains enough solubilizing groups to be sufficiently diffusible after cleavage in an alkaline medium. In the context of the invention, the term "non-diffusing" has the meaning normally associated with it in the photographic field. "Non-diffusing compounds" are understood to be compounds which, in an alkaline medium, are unable to diffuse through the hydrophylic layers containing gelatin for example as binder. The ballast groups attached to the non-diffusing compound for this purpose contain at least 8 carbon atoms and preferably at least 14 carbon atoms. A ballast group may even consist of one or more groups by which $R^1$ and $R^2$ are preferably substituted and which together contribute towards the required resistance to diffusion. Thus the same resistance to diffusion may also be obtained for example by using two or more comparatively small groups, particularly alkyl groups, for example alkyl groups containing from 5 to 12 carbon atoms. It is possible in this way to obtain the same resistance to diffusion as with one ballast group containing for example a relatively long-chain alkyl group with from 8 to 20 carbon atoms.

The expression "diffusible group" applies to the photographically active part of the molecule, for example a dye forming group which is made diffusible by the reductive cleavage reaction.

The two parts of the molecule which have just been mentioned are joined together by a reductively cleavable bond or binding group.

During the development of the photographic recording material, the CR-compounds used in accordance with the invention react with the non-consumed ED-compound which is present in image-wise distribution with reductive cleavage of the ballasted carrier from the diffusible group. This, now independent, part of the molecule containing the photographically active group or the dye group subsequently diffuses into adjacent layers or into the image receiving layers where it performs its characteristic photographic function. Conversely, no electrons are transferred by the ED-compound to the electron accepting CR-compound in the exposed areas, so that no diffusible photographically active compound is released there.

The distribution of the ED-compound which takes place in reversed proportion to the silver developed image-wise is obtained in known manner, for example by image-wise consumption of the ED-compound before the ED-compound is reacted with a CR-compound. If the ED-compound performs the function of a silver halide developer, it is oxidized by the development of the exposed silver halide and, in these parts of the layer, loses its reactivity to act on the CR-compound. In the case of the ED-compounds which are also known per se, but which are not photographic developers, the photographic developer actually present acts as an agent for transferring electrons and, in its oxidised form, reacts with the ED-compound before it has any opportunity to act on the CR-compound. It is through this mechanism that the imagewise distribution is obtained in the form of an image reversal. It is this particular reaction sequence, particularly using ED-precursor compounds, which is preferred for the photographic material according to the invention which contains the CR-compound.

By combining the CR-compounds according to the invention with suitable ED-compounds or ED-precursor compounds and photographic developers as electron transfer agents, it is possible to bring about the component reactions involved in the overall reaction chain substantially independently of one another. This provides dye image with outstanding desitities, whilst at the same time avoiding color fogging.

In addition, the compounds used in accordance with the invention are distinguished by a relatively simple structure and by simple methods of production.

The present invention relates to a photographic material comprising at least one photosensitive silver halide emulsion layer containing at least one non-diffusing compound from which a diffusible photographically active compound, preferably a dye or a dye precursor, is released by a reductive cleavage reaction, this non-diffusing compound being a sulfilimine compound corresponding to the following formula I:

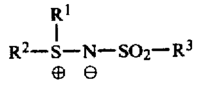

(I)

in which $R^1$ and $R^2$ represent the same or different aryl radicals particularly phenyl, or polynuclear aryl radicals such as naphthyl or anthracyl, at least one of the aryl radicals carrying an electron-attracting substituent in a position ortho or para and optionally additional substituents in any position, and at least one of the aryl substituents carrying a ballasting group; and $R^3$ represents the residue of a diffusible photographically active compound, particularly the residue of a diffusible compound providing an image dye.

Particularly useful compounds of the present invention are those of the following formula II

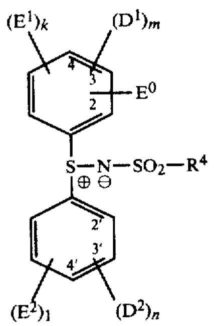

(II)

in which $E^0$ represents $—NO_2$ in 2- or 4-position $E^1$, $E^2$ represent electron-withdrawing substituents in positions 2 or 4 (for $E^1$) and 2' or 4' (for $E^2$), for example $—NO_2$, $—CF_3$, $—CN$, $—SO_2CF_3$, carbalkoxy, alkyl sulfonyl, sulfamoyl, carbamoyl $D^1$, $D^2$ represent radicals conferring resistance to diffusion;

$R^4$ represents the radical of a diffusible dye or dye precursor;

k,l,m,n each are 0 or 1; but $m+n \geqq 1$.

These definitions are sufficient to outline the essential particulars of the structure of the CR-compounds according to the invention. Additionally each of the benzene rings shown may have condensed to it preferably in 2,3-(or 2', 3'-)position a further benzene ring and may carry additional substituents such as halogen, hydroxy, acyloxy, alkoxy or acylamino in a position that is not already occupied by one of $E^0$, $E^1$, $E^2$, $D^1$ and $D^2$.

The sulfamoyl group and the carbamoyl group mentioned in the definition of $E^1$ and $E^2$ may be unsubstituted or substituted at the N-atom with alkyl or aryl. Also the N-atom may be that of a cyclic amino group (pyrrolidino, piperidino, morpholino).

The alkyl portion contained in any one of the carbalkoxy, alkyl sulfonyl and alkyl substituted sulfamoyl or carbamoyl groups mentioned in the definition of $E^1$ and $E^2$ or in any one of the additional substituents such as alkoxy and acylamino may have up to 22 carbon atoms and may carry further substituents such as halogen, alkoxy, phenoxy.

Radicals which confer diffusion resistance are radicals which allow the CR-compounds of the invention to be incorporated in a diffusion resistant form in the hydrophilic colloids normally used in photographic materials. Organic residues which generally carry straight or branched chain aliphatic groups generally having from 8 to 20 carbon atoms and which may also contain carbocyclic or heterocyclic groups are preferably used for this purpose. These residues are attached to the remainder of the molecule either directly or indirectly, e.g. through one of the following groups: —NHCO—; —NH—CO—NH—; $—NHSO_2—$; —NR—, in which R represents hydrogen or alkyl; —o—; —S—; or $—SO_2—$. The residue which confers diffusion resistance may in addition carry groups which confer solubility in water, e.g. sulfo groups or carboxyl groups, and these may also be present in an anionic form. Since the diffusion properties depend on the molecular size of the compound as a whole, it is sufficient in some cases, for example when the molecule as a whole is large enough, to use shorter chain groups as radicals conferring diffusion resistance". A single radical conferring diffusion resistance having at least 8 C-atoms may also be replaced by two or more shorter radicals, for example tertiary butyl or isoamyl groups. Further, in the CR-compounds of the present invention the functions of a radical conferring diffusion resistance ($D^1$, $D^2$) on the one hand and of one of the additional electron-withdrawing substituents on the other hand may be combined in the same substituent when for example a radical conferring diffusion resistance is contained in one of the carbalkoxy, alkyl sulfonyl, sulfamoyl or carbamoyl groups represented by $E^1$ or $E^2$, as may be the case in a $—SO_2—NH—C_{16}H_{33}$ group.

The resistance of a diffusible compound providing an image dye as represented by $R^3$ is preferably the residue of a diffusible dye or dye precursor ($R^4$).

The dye residues may in principle be residues from any series of dyes, provided that they are sufficiently diffusible to be able to diffuse through the layers of the light-sensitive material to the image receiving layer. The dye residues may be equipped with one or more alkali-solubilizing groups for this purpose. Suitable alkali-solubilizing groups include, inter alia, carboxyl groups, sulfo groups, sulfonamide or sulfamoyl groups and such alkali solubilizing groups may be pre-formed in the CR-compounds of the invention or may be formed only when the dye residue is release from the ballasted carrier.

The following are examples of dyes which are particularly suitable for the process according to the invention: Azo dyes, azomethine dyes, anthraquinone dyes, phthalocyanine dyes, indigoid dyes, triphenylmethane dyes, including dyes in the form of metal-dye-complexes or capable to form such complexes if contacted with metal ions.

By residues of dye precursors are meant residues of compounds which are converted into dyes by any of the usual steps or by additional steps during photographic processing, whether it be by oxidation or by coupling or by exposure of an auxochromic group in a chromophoric system, for example by saponification. Dye precursors in this sense may be leuco dyes, couplers or dyes which are converted into other dyes during processing. Where it is not important to distinguish between dye residues and residues of dye precursors, it is to be understood that the term "dye residue" is also used to cover such residues of dye precursors.

Examples of non-diffusing reducible CR-compounds suitable for use in accordance with the invention are given in the following:

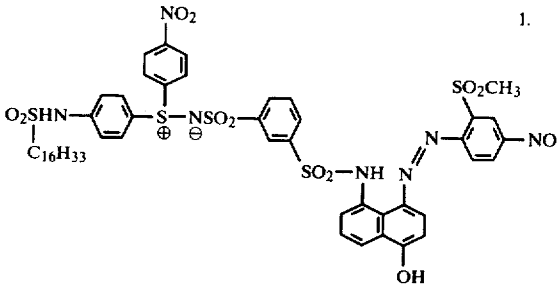

1.

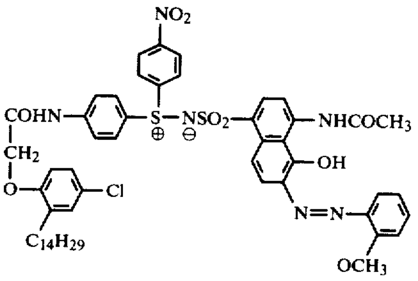

2.

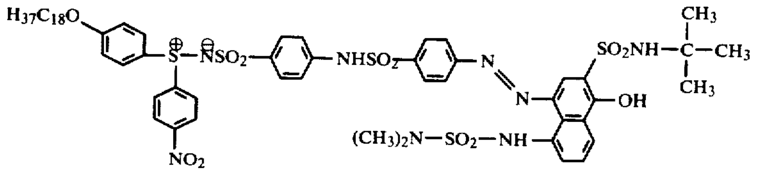

3.

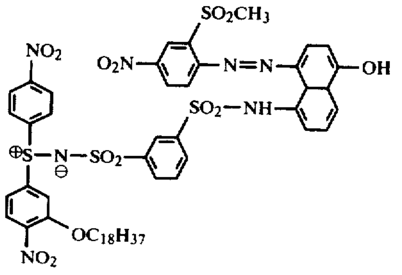

4.

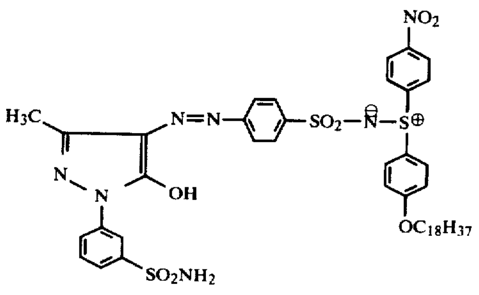

5.

-continued
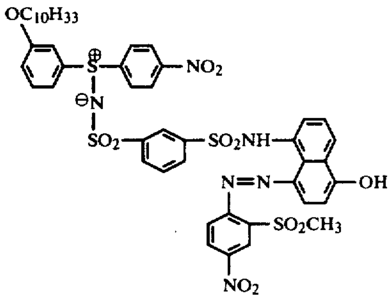
6.
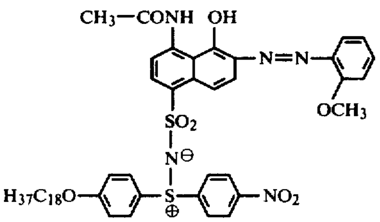
7.
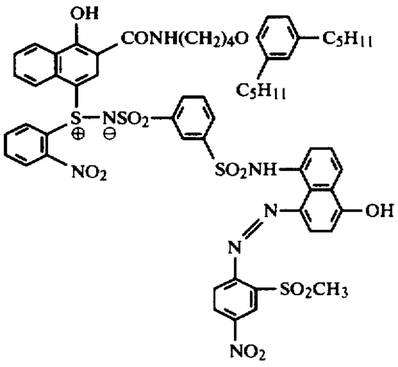
8.
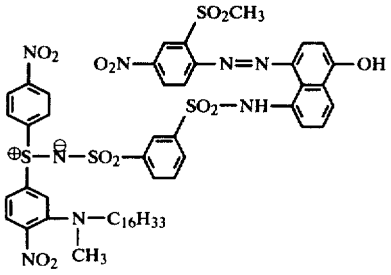
9.
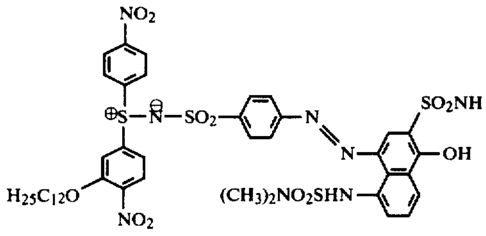
10.
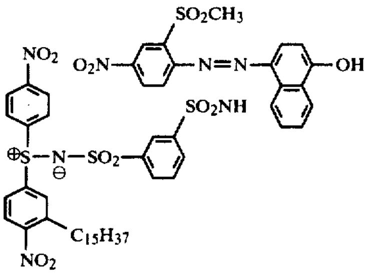
11.
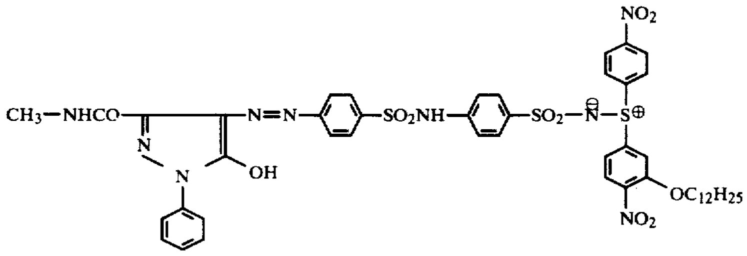
12.
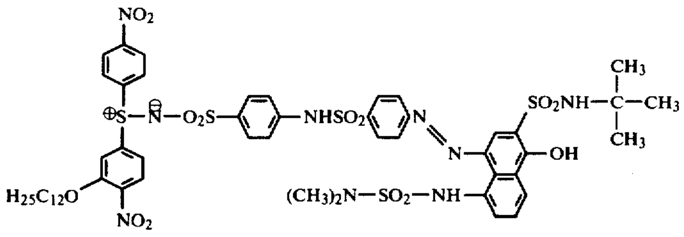
13.

-continued
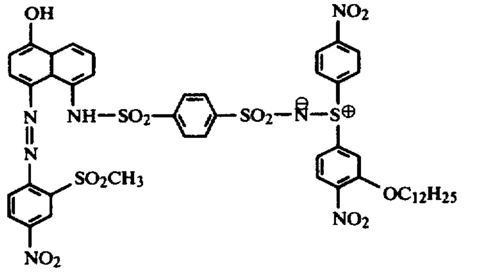
14.
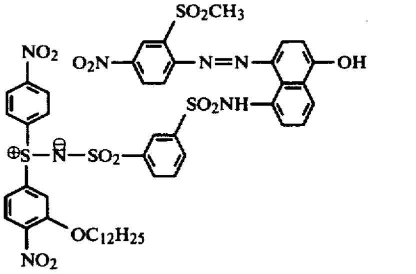
15.
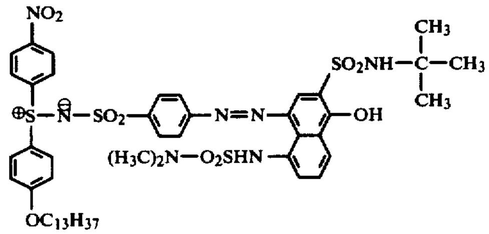
16.
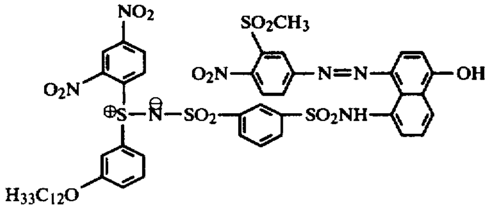
17.
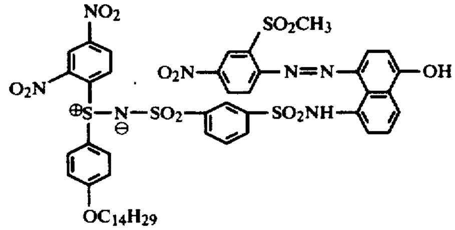
18.
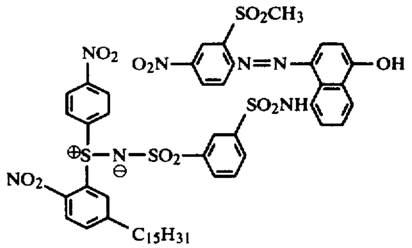
19.
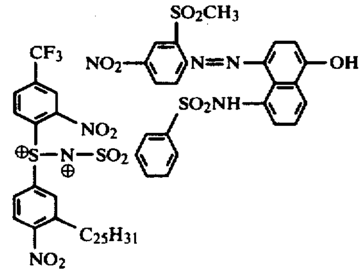
20.
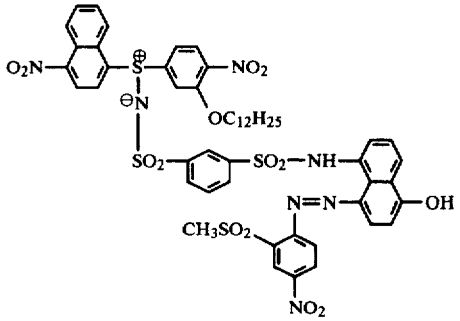
21.
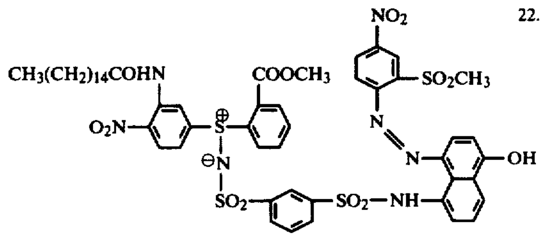
22.
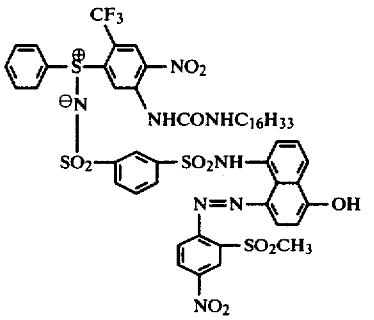
23.

-continued
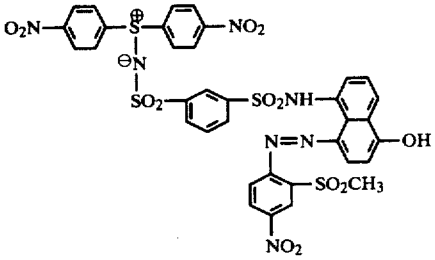
24.
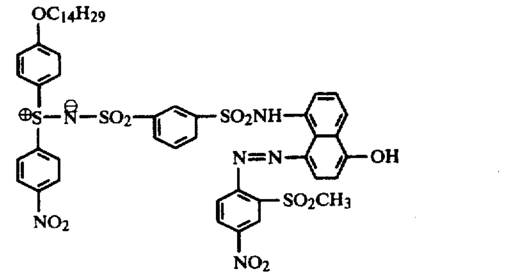
25.
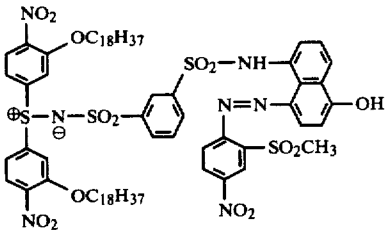
26.
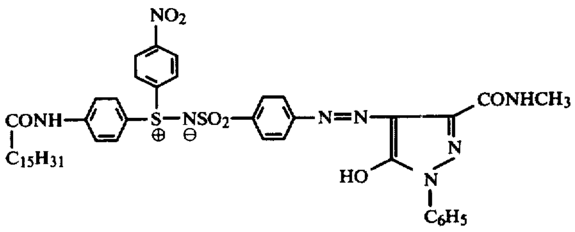
27.
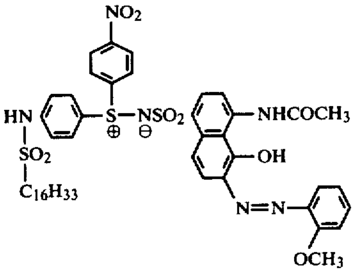
28.
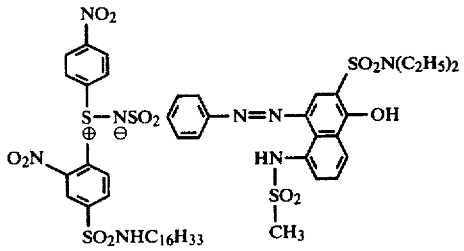
29.
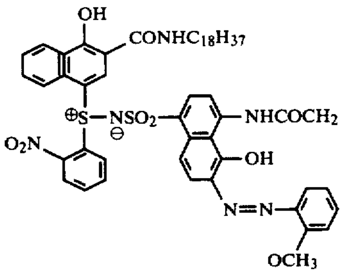
30.
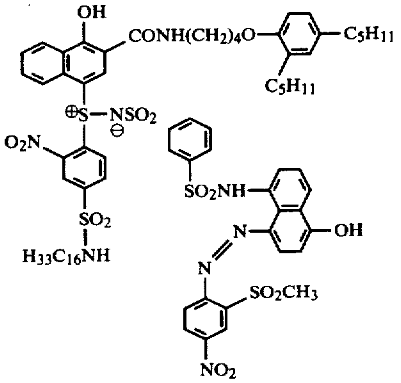
31.
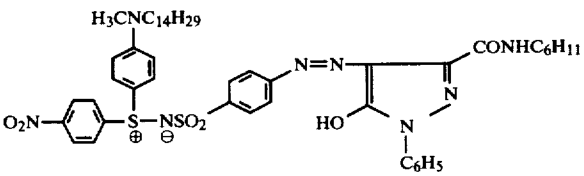
32.
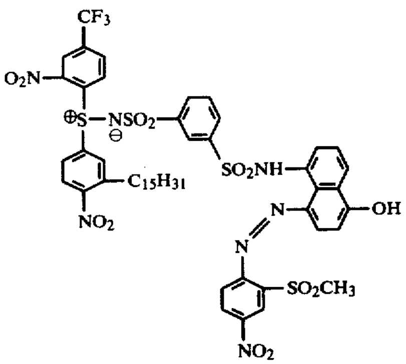
33.

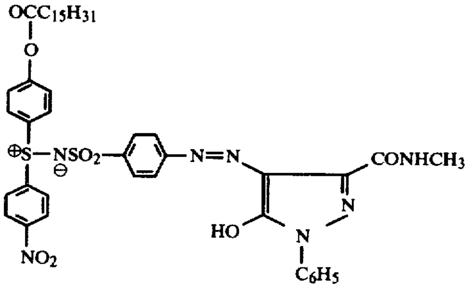

-continued

34.

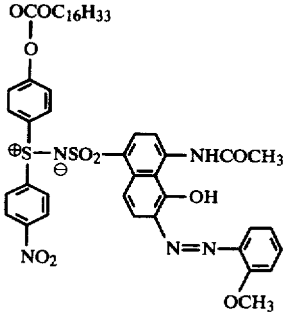

35.

The way in which the CR-compounds used according to the invention function is illustrated by the following reaction scheme.

In the exposed areas of the photographic material, the reducing electron-yielding ED-compound, which is present in active contact with the CR-compound in the photographic layer, is oxidized directly or indirectly by the photographic development reaction. In this form, it is incapable of reacting with the CR-compounds, but in the unexposed areas the unchanged ED-compound reacts with the CR-compound with reductive elimination of the diffusible group, preferably a dye. Reaction scheme for the example of the sulfilimine-CR-compounds:

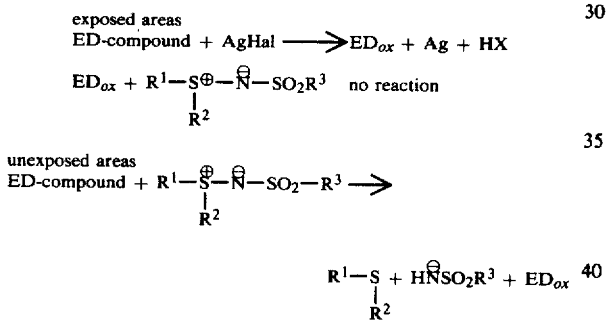

A particular advantage of the CR-compounds used in accordance with the invention lies in the fact that, as shown by the above reaction scheme, photographically active compounds, particularly dyes, containing a sulfamoyl group are formed during the cleavage reaction in the unexposed areas. Dyes such as these can be fixed particularly effectively in image receiving layers containing polymeric mordants. These and other advantages of dyes containing a sulfamoyl group are described in German Offenlegungsschrift No. 2,242,762 and German Offenlegungsschrift No. 2,505,248. However, the coloring systems mentioned therein do not bring about any reversal of image during dye formation, so that they have to be combined with direct-positive silver halide emulsions for the production of positive dye transfer images.

Although, in the case of the already mentioned reducible color providing compounds of the type described for example in German Offenlegungsschrift No. 2,809,716, or of the type described in published European Patent Application No. 4399, a reversal of image is brought about by the cleavage mechanism, the dyes formed contain amino or sulfinic acid groups which are less advantageous.

Another advantage of the CR-compounds, particularly of the color providing sulfilimine compounds used in accordance with the invention lies in the fact that they may be stored virtually indefinitely in alkaline medium and, hence, are superior in this respect to most of the color reducible color providing compounds.

The production of some of the CR-compounds used in accordance with the invention id described in the following. Other compounds which correspond to general formulae I or II are produced similarly. The dye part of the CR-compounds corresponds in its constitution to the dyes typically used in photographic materials and processes where diffusible dyes are used.

The structures of the compounds were confirmed by the usual physical methods, such as infra-red analysis or mass spectrometry and are in accordance with the splitting behaviour.

Compound 1

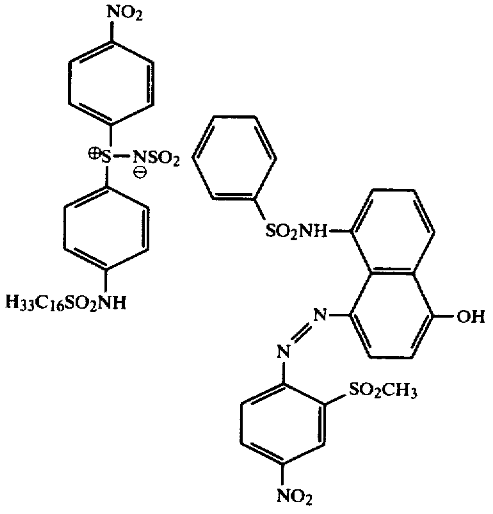

Stage 1

4-nitro-4'-hexadecylsulfonylamino-diphenyl-sulfide 5 g of 4-amino-4'-nitrodiphenyl sulfide (0.02 mole) are dissolved in 70 ml of pyridine, followed by the addition in portions at room temperature of 6.48 of hexadecylsulfochloride (0.02 mole). Stirring is continued for 4 hours, after which the mixture is poured into ice/hydrochloric acid, the deposit is washed with water and recrystallized from methanol.

Yield: 10.25 g=96% of the theoretical. M.p: 68°-70° C.

Stage 2

4-nitro-4'-hexadecylsulfonylamino-diphenyl-sulfilimine mesitylate 5.4 g of mesityl sulfonyl-O-hydroxyl amine (0.025 mole) (Y. TAMURA, I. MINAMIHAWA, M. IKEDA, Synthesis 1977, 1) are dissolved in 30 ml of methylene chloride and 10.7 g of the compound of stage 1 dissolved in 40 ml of methylene chloride are added dropwise with stirring at 0° C. The reaction was over after 4 hours. The solvent was adsorbed, the residue was repeatedly suspended with ether, decanted off and dried in vacuo.

Yield: 13.9 g=97.5% of the theoretical.

Stage 3 (compound 1)

3.74 g of the mesitylate of stage 2 (0.005 mole) are dissolved in 150 ml of methylene chloride, followed by the addition of 3.12 g of 5-(3-chlorosulfonyl-phenylsulfonamido)-4-(2-methyl-sulfonyl-4-nitrophenylazo)-1-naphthol (0.005 mole). 138 g of potassium carbonate dissolved in 150 ml of water are added dropwise with vigorous stirring to this suspension at 0° C. After 2 hours, the two phases are separated, the methylene chloride solution is washed with dilute potassium carbonate solution and then with water until the aqueous phase is colorless. The methylene chloride solution is dried and concentrated and the residue is dissolved in a little ethyl acetate and precipitated with petrol. The deposit is extracted twice by boiling with petrol and filtered off.

Yield: 4.7 g=83% of the theoretical. M.p.: 128°-130° C.

Compound 2

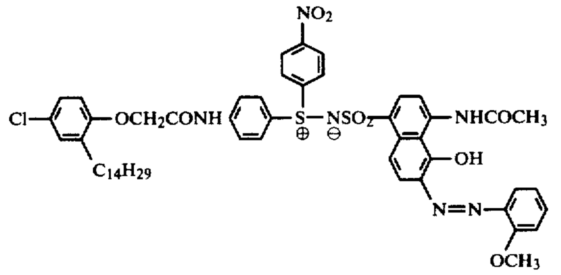

Stage 1

4-nitro-4'-(2'-tetradecyl-4'-chlorophenoxyacetyl)-aminodiphenyl sulfide

A solution of 8.4 g of 2-tetradecyl-4-chlorophenoxy acetic acid chloride (0.021 mole) in 25 ml of acetone is added dropwise with stirring at room temperature to a solution of 5.2 g of 4-amino-4'nitrodiphenyl sulfide (0,021 mole), 2.54 g of N,N'-dimethyl aniline (0.021 mole) in 50 ml of acetone. After 2 hours, the mixture is poured onto ice water/HCL and extracted with ethyl acetate. The ethyl acetate solution is dried, stirred with fuller's earth and filtered off under suction over Theorit. Removal of the solvent by distillation leaves the above-mentioned product behind.

Yield: 10 g=82% of the theoretical.

Stage 2

4-nitro-4'-(2-tetradecyl-4'-chlorophenoxyacetyl)-aminodiphenyl sulfilimine mesitylate 3.1 g (0.0053 mole) of the compound of stage 1 dissolved in 5 ml of methylene chloride are added dropwise at 0° C. to a solution of 1.14 g of MSH (mesityl sulfonyl-O-hydroxyl amine) (0.0054 mole) in 5 ml of methylene chloride. The reaction was complete after 2 hours. The solvent was distilled off and the residue was dissolved in ether and precipitated with petrol.

Yield: 4.05 g=92.5% of the theoretical.

Stage 3 (compound 2)

0.45 g (0.0033 mole) of potassium carbonate dissolved in 1 ml of water is added dropwise with stirring at room temperature to a suspension of 1.1 g (0.00133 mole of the mesitylate of stage 2 and 0.58 g (0.00133 mole) of 8-acetylamino-5-chlorosulfonyl-2-(2-methoxy-phenylazo)-1-naphthol in 15 ml of acetone. After stirring for 2 hours at room temperature, the deposit is filtered off under suction, washed with water and acetone and dried.

Yield: 1.0 g=77.2% of the theoretical. M.p.: 188°-192° C.

Compound 8

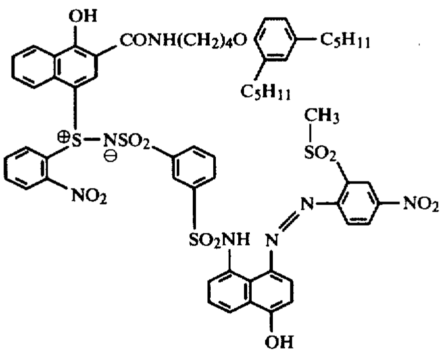

Stage 1

4-(2'-nitrophenylthio)-hydroxy-2-(2'',4''-di-t-pentyl-phenoxybutyl)-naphthamide 8.9 g (0.019 mole) of 1-hydroxy-2-(2',4'-di-t-pentyl-phenoxybutyl)-naphthamide dissolved in 60 ml of chloroform are added dropwise at room temperature to a solution of 4.75 g (0.025 mole) of 2-nitrobenzene sulfenyl chloride in 40 ml of chloroform. The solution is heated under reflux for 3 days. The solvent is distilled off and the residue is crystallized with petrol. Recrystallization from petrol.

Gross yield: 10.35 g.

Stage 2

4-(2'-nitrophenylsulfilimino)-1-hydroxy-2-(2'',4''-di-t-pentyl phenoxybutyl)-naphthamide mesitylate.

The thioether of stage 1 is reacted in known manner with MSH. After a reaction time of 3 hours, the solvent is distilled off and the mesitylate is crystallized with ether.

Yield: 95.8%. M.p.: 182°-185° C.

Stage 3 (compound 8)

2.65 g (0.003 mole) of the mesitylate of stage 2 and 1.88 g (0.003 mole) of 5-(3-chlorosulfonylphenyl sulfonamido)-4-(2-methyl sulfonyl-4-nitrophenylazo)-1-naphthol are suspended in 200 ml of acetone, followed by the gradual addition at room temperature of 0.82 g (0.006 mole) of potassium carbonate dissolved in a little water. The solution was stirred overnight and then concentrated the residue was taken up in ethyl acetate and undissolved fractions were separated off, after which the solution was concentrated again and the residue purified by column chromatography over silica gel in toluene/methanol (3:1).

Yield: 2.23 g=61% of the theorital. M.P. 183°-190° C.

In the same way as described for CR-compounds 1,2 and 8 other CR-compounds have been prepared and are found to have melting points as indicated in the following table.

| CR-Compound | m.p. (°C.) |
|---|---|
| 3 | 194-205 |
| 4 | 115-117 |
| 5 | 98-101 |
| 6 | 105-112 |
| 7 | 181-182 |
| 9 | 108-110 |
| 10 | 104-168 |
| 11 | 145-146 |
| 12 | 135-138 |
| 14 | 205-207 |
| 15 | 118-122 |
| 16 | 173-178 |
| 17 | 168-171 |
| 18 | 117-123 |
| 19 | 114-117 |
| 20 | 108-109 |
| 21 | 120-123 |
| 22 | 104-106 |
| 24 | 248 |
| 25 | 105-108 |
| 26 | 186-188 |

Since the photographic recording material according to the invention is preferably used for the production of color photographs in natural colors, it preferably has the structure required for this purpose and contains a red-sensitive silver halide emulsion layer containing a CR-compound which splits off a diffusible cyan image dye, a green-sensitive silver halide emulsion layer containing a CR-compound which splits off a diffusible magenta dye and a blue-sensitive silver halide emulsion layer in which a diffusible yellow dye is formed imagewise from the CR-compound.

However, the CR-compounds do not necessaily have to be present in the silver halid emulsion layer. The only requirement is that they should be in effective contact with that layer. This merely means that the CR-compounds have to be arranged within or in relation to the silver halide emulsion layer in such a way that the entire reaction chain, beginning with the photographic development of the exposed silver halide up to splitting off of the image dye, can be completed. Accordingly, it is readily possible to arrange the non-diffusing CR-compounds in separate layers which are of course preferably adjacent to the silver halide emulsion layers. Provision has to be made in known manner to ensure that the CR-compounds which are associated with a silver halide emulsion layer sensitive to a certain region of the spectrum and which contain a corresponding dye moiety that can be split off are not adversely affected by diffusing products of silver halide emulsion layers of different spectral sensitivity. It is of course important to ensure that the silver halide emulsion layers and adjacent layers—if any—containing the CR-compounds are permeable to the photographic alkaline developer.

The CR-compounds used in accordance with the invention may be employed with advantage for color diffusion processes which are suitable for the production of so-called instant color images. Processes and materials of this type are known and are described in numerous patent specifications. Reference is made for example to the comprehensive observations in published European Patent Application No. 4399.

A photographic material suitable for the production of instant color photographs is in principle made up as follows: A photosensitive recording part containing the silver halide emulsion layers of normal spectral sensitivity and the color-matched CR-compounds; an image receiving layer which is permeable both to the alkaline developer medium and also to the diffusible image dyes produced during the reductive cleavage reaction; means for storing and uniformly distributing the alkaline developer medium, preferably developer pastes, within the photographic material, for example in a container which is arranged and constructed in such a way that the container opens under the effect of pressure and the developer medium is uniformly distributed within the photographic material.

In this case, processing to form the colored image is carried out by initially exposing the material imagewise and then ditributing the alkaline developer fluid or paste within the photographic recording material, an ED-compound or ED-precursor compound and an electron transfer agent, generally the photographic developer, having to be present while the alkaline developer fluid is performing its function. The silver halide in the photosensitive layers is developed proportionately to exposed areas whilst, in the unexposed areas, the CR-compound is cleaved by reduction in inverse proportion to development and the diffusible, photographically active compound (generally a dye) is released. This compound the diffuses imagewise into the image-receiving layer.

The photographic instant-image materials of the type in question which have a so-called integral structure, a light-reflecting layer and an opaque light-absorbing layer are preferably situated between the image-receiving layer and the photosensitive layers.

So-called integral structures such as these of the photographic material were described in U.S. Patent Nos. 2,543,181 and 3,053,659 and later in German Auslegeschrift No. 1,924,430. These photographic instant-image color materials are characterized in that development and formation of the dye image takes place outside the camera and in that the dye image formed is exposed and viewed from different sides of the photographic material. The alkaline developer fluid is generally distributed between the photosensitive silver halide emulsion layers and a transparent cover sheet. In addition, opacifiers, such as dyes or pigments, are added to the developer fluid. In this way, the formation of a light-impermeable layer of the distributed developer, in combination with the above-mentioned opaque light-absorbing layer and reflecting layer between the photosensitive layers and the image-receiving layer, prevents unfavourable uniform exposure of the photosensitive layers after the material has been removed from the camera. By taking certain measures, it is also possible with photographic recording materials containing the CR-compounds according to the invention to obtain positive dye images which are not dye transfer images but retained dye images. Embodiments such as these are described for example in German Offenlegungsschrift No. 2,809,716.

As mentioned earlier, the CR-compounds are used in combination with an ED-compound in order to release the diffusible, photographically active compound imagewise by reductive cleavage. In the exposed areas, the ED-compound is oxidized or inactivated imagewise before it is able to react with the CR-compound. In this way reversal of the image is obtained during the reductive cleavage of the CR-compound.

An ED-compound is generally understood to be a compound which is capable of reacting with the CR-compound used in accordance with the invention.

The ED-compound is used in combination with an electron-transfer compound (hereinafter referred to in short as the ETA-compound). In this case, the ETA-compound is intended to have the properties of a silver halide developer. So far as its reducing effect upon the silver halide is concerned, it is intended to be able to have a stronger reducing effect than the ED-compound, i.e. during the photographic development reaction, the ETA-compound is consumed in the exposed areas before it is able to react with the ED-compound. Because of its lower reactivity with respect to the exposed silver halide, the ED-compound, if it has photographic developer properties, also has no opportunity to act during the photographic development reaction. After photographic development, the unconsumed ETA-compound is present in the photographic material in imagewise distribution, inversely to the exposed image, in the unexposed parts of the layer assembly where no photographic development has taken place, and is then able to react with the ED-compound in these parts of the layer assembly.

In this way, the component reactions belonging to the overall reaction mechanism are differentiated as a function of time in the sense that first the photographic development reaction, then the imagewise deactivation of the ED-compound and, finally, the reductive cleavage of the CR-compound by reaction with the ED-compound take place at separate times. This required differentiation in time may be further improved, for example by arranging the ED-compound and the CR-compound in heterodisperse distribution in the photographic layer, for example in finely divided droplets of a so-called oil former, whilst the ETA-compound is contained in the hydrophilic layer binder.

In one particularly preferred embodiment, so called ED-precursor compounds are generally understood to be compounds which contain the reduction-active function required for the reductive cleavage of the CR-compound in chemically masked form. It is only at certain pH-values that the ED-precursor compounds are converted into ED-compounds which only then are capable of reacting with the CR-compound. It is possible in this way further to differentiate the component reactions as a function of time and hence to obtain improved possibilities of controlling the entire mechanism.

In general, suitable ETA-compounds are the usual photographic developers, for example hydroquinone or derivatives thereof, such as 2-5-dichlorohydroquinone and 2-chlorohydroquinone; aminophenol compounds, such as 4-aminophenol, N-methylamino-phenol, 3-methyl-4-aminophenol or 3,-5-dibromoaminophenol; pyrocatechol or derivatives thereof, such as 4-cyclohexyl pyrocatechol, 3-methoxy pyrocatechol and 4-(N-octadecylamino)-pyrocatechol; phenylene diamine developers, such as N,N-diethyl-p-phenylene diamine, 3-methyl-N,N-diethyl-p-phenylene diamine, 3-methoxy-N-ethyl-N-ethoxy-N,N-diethyl-p-phenylene diamine, 3-methoxy-N-ethyl-N-ethoxy-p-phenylene diamine or N,N',N'-tetramethyl-p-phenylene diamine.

However, the preferred ETA-compounds are photographic developers of the 3-pyrazolidone type, for example 1-phenyl-3-pyrazolidone, 1-phenyl-4,4-dimethyl-3-pyrazolidone, 4-hydroxymethyl-4-methyl-1-phenyl-3-pyrazolidone, 1-phenyl-4-methyl-3-pyrazolidone, 1-phenyl-5-methyl-3-pyrazolidone, 1-phenyl-4,4-bis-(hydroxymethyl)-3-pyrazolidone, 1,4-dimethyl-3-pyrazolidone, 4-methyl-3-pyrazolidone, 4,4-dimethyl-3-pyrazolidone 1-(3-chlorophenyl)-4-methyl-3-pyrazolidone, 1-(4-chlorophenyl)-4-methyl-3-pyrazolidone, 1-(3-chlorophenyl)-3-pyrazolidone, 1-(4-chlorophenyl)-3-pyrazolidone, 1-(4-tolyl)-4-methyl-3-pyrazolidone, 1-(2-toyl)-4-methyl-3-pyrazolidone, 1-(4-tolyl)-3-pyrazolidone, 1-(3-tolyl)-3-pyrazolidone, 1-(3-tolyl)-4,4-dimethyl-3-pyrazolidone, 1-(2-trifluoroethyl)-4,4-dimethyl-3-pyrazolidone and 5-methyl-3-pyrazolidone.

The ETA-compounds which act optimally for a given special system may readily be determined by standard routine tests. It is of course also possible to use combinations of several ETA-compounds.

The ETA-compounds or photographic developers may be introduced in different ways into the reaction taking place in the photographic material. For example they may be added to the developer fluid and may be used with it in the usual way. They may also be completely or partly added to one layer or to several layers of the photographic material, for example to one or more of the photosensitive silver halide emulsion layers, auxiliary layers, intermediate layers or even image-receiving layers.

Suitable ED-compounds or ED-precursor compounds are the compounds which have already been described for this purpose. Some examples of these compounds are given hereinafter.

The ED-compounds or ED-precursor compounds are preferably introduced into the photographic material in such a way, or the photographic material is made up in such a way, that these compounds can only be active for the formation of the particular component colour image. As already mentioned, a photographic recording material for producing the three component color images, namely a blue-sensitive silver halide emulsion layer with means for forming the yellow component color image, a green sensitive silver halide emulsion layer with means for forming the magenta component color image and, finally, a layer unit containing a red-sensitive silver halide emulsion layer and means for forming the cyan component color image. The ED-compounds or ED-precursor compounds are used in such a way that they are only active in the layer unit associated with them. This result may be achieved for example by separating the respective layer units by intermediate layers containing compounds for arresting the ED-compounds or ED-precursor compounds. Another way of limiting the effect of the ED-compounds or ED-precursor compounds to the particular layer unit is to incorporate these compounds in non-diffusing form. This is achieved by the usual means, for example by substitution with ballast groups, generally long-chain alkyl radicals, or by incorporation in heterodisperse form in solution in socalled oil formers. The technique required for this purpose is known from the introduction of color couplers into conventional color photographic materials.

As mentioned earlier on, it is of particular advantage to use so-called ED-precursor compounds. It is possible in this way to achieve a particularly high degree of image resolution and to avoid the formation of color fogs. These requirements are of major importance in regard to the materials mentioned earlier on for producing natural color images which comprise several layer units for forming the necessary component color images. The principle on which the action of the ED-precursor compounds is based as described earlier on. Because of their instability in alkaline pH-value ranges, the ED-precursor compounds are converted hydrolytically into the ED-compounds. In view of the limited hydrolysis velocity of the ED-precursor compounds, it is possible to select a particularly suitable ED-precursor compound by choosing one for the corresponding special reaction system and hence, optimally to control the mechanism as a whole. In the exposed areas, the Ed-compound formed by hydrolysis of the ED-precursor compound reacts immediately with the oxidized ETA-compound (oxidized photographic developer) and, as a result, loses its ability to cleave the CR-compound by reduction. During the reaction in question, the oxidized developer substance is reduced and is thus available for developing further exposed silver halides.

By contrast, in the unexposed areas, the ED-compound formed hydrolytically from the ED-precursor compound reacts immediately with the CR-compound, because no oxidized photographic developer is available in the unexposed ares, with reductive cleavage and formation of the diffusible, photographically active compound, preferably an image dye.

There ED-precursor compounds are used, it is again of advantage to use them in non-diffusing form, i.e. substituted by ballast groups, or in heterodisperse distribution. As already mentioned, heterodisperse incorporation is obtained by dissolving the ED-precursor compound in so-called oil formers and emulsifying the organic solution into the aqueous casting solution for the particular layer. The ED-precursor compound and the CR-compound may be incorporated in separate solutions, although in many cases it is of advantage to incorporate the ED-precursor compound together with the CR-compound so that these two reactants are present together in the droplets of the oil former.

Since the reductive cleavage reaction again takes place at a certain velocity dependent upon the nature of the reactants, it is possible by suitably selecting the pair of reactants consisting of the ED-compound and the CR-compound to control the formation of the diffusible photograhically active compound and hence to obtain optimal results. The concentration of the ED-compounds or ED-precursor compounds in the layer units of the photographic material may vary within wide limits. In general, concentration ratios of the ED-compound or ED-precursor compound to the CR-compound of from 1:2 to 2:1 and preferably from 1:1 to 2:1 have proved to be suitable.

The following are examples of suitable ED-compounds or ED-precursor compounds:

Compounds of the iso-oxazolone type according to DE-OS No. 2,809,716

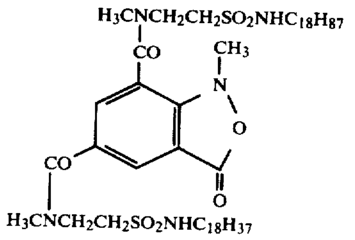

ED 1

Sulfonylaminonaphthols or ballasted p-phenylene diamine compounds

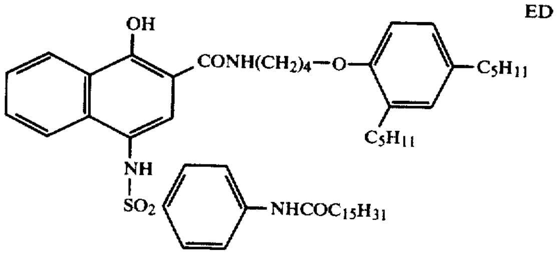

ED 2

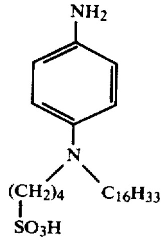

ED 3

Non diffusing hydroquinone derivatives

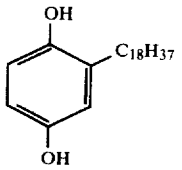

ED 4

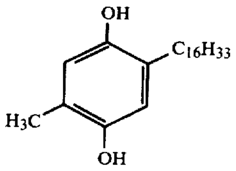

ED 5

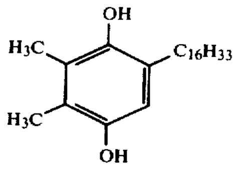

ED 6

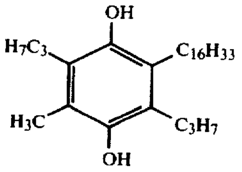

ED 7

Masked aminophenol derivatives as ED-precursor compounds

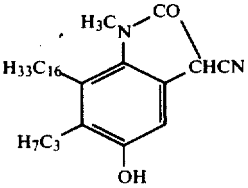
ED 8

Benzofuranone derivatives as ED-precursor compounds according to German Application P 30 06 268.1

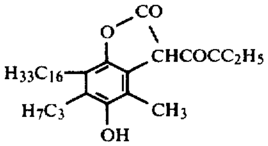
ED 9

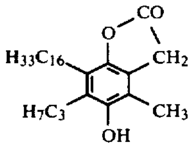
ED 10

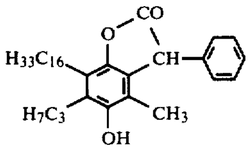
ED 11

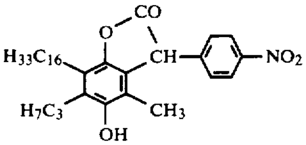
ED 12

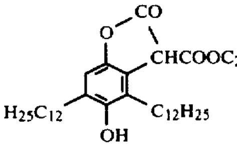
ED 13

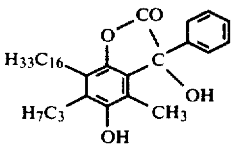
ED 14

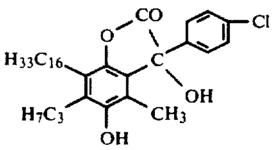
ED 15

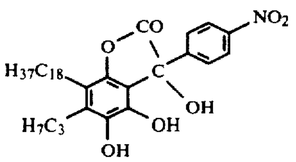
ED 16

-continued

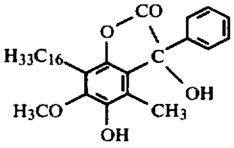
ED 17

Mercapto compounds $H_{29}C_{14}SH$ ED 18

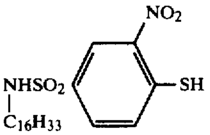
ED 19

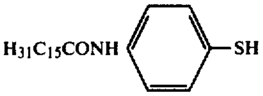
ED 20

Preferred ED-precursor compounds for combination with the CR-compounds according to the invention are 5-membered or 6-membered α-lactones of phenol, the phenol ring containing a hydroxyl group or an amino group bound to the benzene ring in the 2-position or 4-position to the lactonized phenol group and the lactone ring containing electron-attracting substituents which split up the lactone ring by hydrolysis to form the ED-compound at pH-values of from 10 to 13.

ED-precursor compounds of this type are described in German Patent Application No. P 30 06 268.1. Particularly preferred ED-precursor compounds such as these are benzofuranone derivatives containing electron-attracting substituents in the lactone ring. ED-precursor compounds of outstanding significance for use in combination with the CR-compounds according to the invention are ED-precursor compounds of the same type as compounds ED 14 to ED 17 which may be defined by the following general formula:

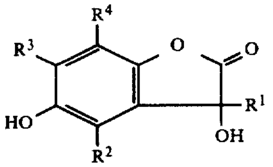
III in which $R^1$ represents a carbocyclic or heterocyclic aromatic group;

$R^2$, $R^3$, and $R^4$ which may be the same or different represent hydrogen, alkyl, alkenyl, aryl, alkoxy, alkylthio or amino or $R^3$ and $R^4$ may together complete a fused, particularly carbocyclic ring, at least one of the substituents $R^1$, $R^2$, $R^3$ and $R^4$ containing a diffusion-impeding ballast group with 10 to 22 carbon atoms.

The combination of these ED-precursor compounds with the CR-compounds according to the invention makes it possible for excellent color densities and color images to be obtained with hardly any troublesome fogging. The ED-precursor compounds are added to the photographic layers as described in German Patent Application No. P 30 06 268.1.

A diffusible, photographically active radical $R^3$ in general formula I above for the CR-compounds used in accordance with the invention is understood to be a radical which, after cleavage by reduction, has a photographically active function in diffusible form in photographic recording processes.

Thus, this radical may represent a dye or a dye precursor. In addition, this radical may even be split off in form of a diffusible compound which is photographically active in another direction, for example as stabilizer for avoiding fogging, as toner, as fixing agent, as developer or development accelarator, as hardener, as silver halide solvent, as development inhibitor or the like. In the reductive cleavage reaction corresponding to the reaction scheme given earlier on, the diffusible, photographically active compound is formed with an $SO_2NH_2$-group from the bond to the carrier radical.

Since the CR-compounds used in accordance with the invention are particularly suitable for the production of photographic color images, it is preferred to use those CR-compounds containing a dye-forming radical as the diffusible, photographically active radical. The radical in question may be a radical which represents a pre-formed dye, a so-called shifted dye or a dye precursor product. Suitable preformed dyes or dyes which are subsequently formed are the dyes normally used for photographic image dyes, for example azo dyes including metallisable azo dyes and metallised azo dyes, azomethine (imine) dyes, anthraquinone, alizarine, merocyanine, quinoline and cyanine dyes and the like.

Suitable dye radicals are described in detail in particular in German Offenlegungsschrift Nos. 2,242,762 and 2,505,248. Reference is also made to German Offenlegungsschrift Nos. 2,626,821 and 2,756,656 for yellow dyes, to German offenlegungsschrift Nos. 2,406,626; 2,406,627 and 2,503,443 for magenta dyes and to German Offenlegungsschrift Nos. 2,406,653; 2,462,010 and 2,607,440 for cyan image dyes.

Suitable metallizable or metallized dyes as photographically active radicals for the CR-compounds used in accordance with the invention are described in U.S. Pat. Nos. 4,165,238; 4,165,987; 4,183,754 and 4,183,755.

So-called "shifted dyes" are understood to be dyes of which the absorption properties undergo hypsochromic or bathochromic displacement when the dyes are subjected to a change of medium, for example by a change in the pH-value, or are modified chemically, for example through the formation of metal complexes or through the release of a substituent from the chromophoric system of the dye, as described in U.S. Pat. No. 3,260,597. The "shifted dyes" are advantageous because their absorption ranges lie initially outside the photosensitivity range of the associated silver halide emulsions, so that no reduction in photosensitivity is possible. It is only during processing, for example in the image-receiving layer, that these dyes are converted by the factors mentioned above into dyes which absorb in the required absorption range of the image dyes.

"Diffusible, photographically active radicals" which are released in form of a dye precursor compound during cleavage by reduction are understood to be radicals which, initially, are substantially colorless, but which are converted by chemical reacton into an image dye during photographic processing. Suitable dye precursor radicals, are, for example, oxychromogenic compounds or color coupler radicals.

Diffusible color coupler radicals are released imagewise in the usual way during cleavage by reduction.

Suitable color coupler radicals are the compounds normally used in conventional color photography, such as pyrazolone couplers for the production of magenta dyes, open-chain ketomethylene compounds for the production of yellow image dyes or phenol or naphthol derivatives for the production of cyan image dyes. The image dye is formed by standard reaction with an oxidized color developer, particularly of the phenylene diamine type. These oxidized color developers may be incorporated in certain layers—according to function image-receiving layers—preferably in non-diffusing form. When the color coupler diffusing imagewise reaches these layers, the required image dye is formed. So far as suitable non-diffusing color couplers are concerned, reference is made to U.S. Pat. No. 3,620,747.

In the case of oxychromogenic compounds as diffusible radicals releasable from the CR-compound, the compounds in question are those which, initially, do not contain any chromophoric groups and are therefore colorless. Having been split off, they are also able to diffuse into suitable layers where they are converted into the image dyes, for example by oxidation under the effect of air or by the addition of further oxidizing agents. Oxychromogenic compounds of this type are also known as leuco compounds. Leuco compounds such as these are known per se, for example leucoindoanilines, leuce-indophenols or leuco-anthraquinones. Reference is made to U.S. Pat. No. 3,880,658.

CR-compounds containing radicals other than image-dye-forming radicals as diffusible, photographically active radicals are added to the photographic materials in the same way as the CR-compounds which yield the image dyes during cleavage by reduction, i.e. according to the nature of the photographically active radical in the photosensitive silver halide emulsion layer or in adjacent layers. Concentrations of from 0.01 to 1 g per $m^2$ may be used according to function and the required effect. In the case of development inhibitors or stabilizers as photographically active, diffusible radicals, the CR-compounds are used in the photographic material in such a way that they are able to act in contact with the silver halide emulsions. Accordingly, the development inhibitor or the stabilizer is formed in image-wise distribution in the unexposed areas. The result of this is that the formation of developed silver, i.e. unwanted fogging, is effectively suppressed in the substantially or completely unexposed parts of the layer(s). Since the formation of developed silver suppresses the formation of dyes by deactivation of the ED-compounds or ED-precursor compounds, the simultaneous use of dye-forming CR-compounds with CR-compounds which release development inhibitors promote dye formation in the unexposed areas and, hence increase image dye density.

As already mentioned, the advantage of the CR-compounds used in accordance with the invention is that image reversal occurs during formation of the dye so that negative silver halide emulsions may be used in photosensitive layers. However, it is obvious that, for special materials which require a different type of image reversal, the CR-compounds according to the invention may also be used in combination with direct-positive silver halide emulsions or reversal emulsions.

Despite the various potential applications of the CR-compounds according to the invention, the most important application is in the production of color images. To this end, they are used in quantities which have to be sufficient to obtain a dye image of adequate density. Although the required color density depends on other factors, such as the thickness of the layer and the absorption properties of the diffusible dye released, it has nevertheless proved to be best to use the CR-compounds in concentrations of from $10^{-5}$ moles per $m^2$ and preferably in concentrations of from $10^{-4}$ to $2.10^{-3}$ moles per square meter.

The concentration ratios of the CR-compounds according to the invention to the other components of the reaction mechanism may be determined from case to case by standard routine tests. In general, the following molar ratios will suffice:

1 mole of CR-compound: 1 to 5 moles of ED-compound: 2 to 20 moles of silver halide, preferably 1 mole of CR-compound: 1.5 moles of ED-compound: 5 moles of silver halide.

Although the most important use of the CR-compounds is in the production of colored images by using the image dyes splitt off by reduction, it is also possible in principle to use the non-cleaved CR-compounds left behind in the original layers for producing colored images by known additional measures.

The photosensitive silver halide emulsion layers suitable for the photographic materials according to the invention have the usual composition.

Silver chloride or silver bromide may be used as the silver halides either individually or in admixture and may have a silver iodide content of up to 10 mole percent. The size of the silver halide grains may vary within wide limits. In general, grain sizes of from 0.3 to 5 μm are used.

The layer binders used are again the usual hydrophilic polymeric binders permeable to aqueous alkaline solutions preferably gelatin, although it may be completely or partially replaced by other synthetic hydrophilic polymers. It can be favourable, particularly for dye transfer processes, to use for certain purposes hydrophilic colloid layers of the type whose permeability to the diffusible compounds, particularly the dyes, is dependent on the pH. Polymers such as these are known per se for photographic materials. They are distinguished by the fact that they contain acid groups. The known layer binders may also be used for the image receiving layer. In general, the layer binders in question here are the so-called polymeric mordants which must be capable of arresting the image dyes diffusing into this layer and preventing them from diffusing any further. The image dyes and the polymeric mordants may be adapted to one another by suitable selection to obtain optimal results.

As for the rest, the photographic materials may have the usual composition for the production of dye transfer images and, in addition to the image receiving layer and the photosensitive layers, may contain auxiliary layers known per se, for example of the type which, after development and dye formation, lower the pH-value within the layer assemblage. Layers and measures such as these for controlling the reduction in pH are known per se. It is a routine measure to build up an optimal material for the particular purpose in question with the assistance of known means.

Alkaline developer fluid or pastes of standard composition are suitable for the development of the photographic materials according to the invention. Suitable developers are alkalis, for example alkali metal hydroxides, particularly sodium hydroxide, or carbonates or suitable amines, for example diethylamine. The developers have a pH-value in the usual range (preferably above 12). They contain the usual developer compounds mentioned above. The viscosity of the developers is increased by the usual additives, such as natural or synthetic polymers of relatively high molecular weight.

The support layers used for the photographic materials according to the invention are again the usual support layers, such as films of cellulose triacetate, polyesters, such as polyethylene terephthalate, and others.

The CR-compounds and ED-compounds or ED-precurso compounds used in accordance with the invention are incorporated into the required layers of the photographic material by methods known per se. As mentioned above, it is of advantage in many cases to introduce the abovementioned compounds into the hydrophylic layer binders in heterodisperse form, for example using solvents and suitable processes. Reference is made for example to U.S. Pat. Nos. 2,322,027 and 2,801,171. Suitable solvents are generally the solvents which are also used for the incorporation of conventional color couplers, for example tri-o-cresyl phosphate, di-n-butyl phthalate, 2,4-diamyl phenyl, or preferably dialkyl amides of alkane acids containing from 8 to 22 carbon atoms, particularly dialkyl amides, such as diethyl amide, of lauric or palmitic acid. Other suitable solvents are described in the journal "product Licensing Index", Vol 83, pages 26 to 29. In certain cases, it may be favourable to use water-miscible organic solvents, such as tetrahydrofuran, short-chain alkanols, such as methyl alcohol, ethyl alcohol or isopropyl alcohol, acetone, 2-butanone, N-methyl pyrrolidone, dimethyl formamide, dimethyl sulphoxide or mixtures thereof. The photographically active compounds may also be introduced by means of so-called chargeable polymer latices. These methods are generally known; cf. for example German Offenlegungsschrift No. 2,541,274.

PHOTOGRAPHIC EXAMPLE

A mordant layer, a light-reflecting layer and a photosensitive silver halide emulsion layer were applied in the following sequence to a transparent support layer of cellulose triacetate:

Mordant Layer 3.75 g of a copolymer of 1 part of styrene and 1 part of maleic acid imide of N,N-dimethyl-N-hexadecyl-N-ω-amino propyl ammonium bromide were dissolved in 15 ml of ethanol and the resulting solution was stirred into 75 ml of a 5% gelatin solution and homogenized. After the addition of 2.6 ml of a 5% saponin solution and 1 ml of a 2% aqueous mucochloric acid solution, the emulsion was adjusted to a standard casting viscosity (approximately 11 mPa.s) and applied to the support by dip-coating at 40° C.

Light-Reflecting Layer

A suspension of 42 g of $TiO_2$ in 20 ml of water was dispersed in 150 ml of a 8% aqueous gelatin solution to which 5 ml of a 5% aqueous solution of sodium dodecyl benzene sulfonate and 5 ml of a 5% aqueous saponin solution had been added. After the addition of 1 ml of a 2% mucochloric acid solution, the dispersion was adjusted to a viscosity of 13 mPa.s at 40° C. and applied to the dried mordant layer by dip-coating.

Light-Sensitive Layer 1 mMole of CR-compound 1 and 1.5 mMoles, of ED-compound 14 were dissolved in 5 ml of ethyl acetate and, following the addition of 2 ml of pamitic acid diethyl amide, the resulting solution was emulsified into 25 ml of a 5% gelatin solution, to which 5 ml of a 5% aqueous solution of sodium dodecyl benzene sulfonate has been added, in a homogenizer at approximately 1000 r.p.m. The emulsion was filtered through a folded filter and made up to 75 ml with 5% gelatin solution. After the addition of 1 ml of a 2% mucochloric acid solution, 32 g of a silver bromide gelatin emulsion ready for casting, containing 0.67 mole percent of AgI, were added to the emulsion. This silver gelatin bromide gelatin emulsion had been prepared with 74 g of $AgNO_3$ per kg of emulsion. The silver:gelatin ratio was 1:1.1. The mixtures were applied to the light-reflecting layer described above at approximately 40° C. at a rate 5 meters per minute.

After drying for 24 hours, several samples are exposed through a grey step filter on the emulsion side and developed at 18° C. with a developer paste of the following composition applied in a layer approximately 300 μm thick, stoped for 2 minutes in a 5% acetic acid solution, briefly rinsed and then dried. For a first sample the development time was 1 minute, and for a second sample four minutes.

Developer 20 g of carbethoxy methyl cellulose were dissolved with stirring in 800 ml of water. 40 g of solid NaOH, 1.5 g of the sodium salt of ethylene diamine tetraacetic acid, 11.5 g of borax, 1 g of sodium hexametaphosphate, 3 g of KBr, 1.6 g of 1-phenyl-4-methyl-4-hydroxymethyl-3-pyrazolidone and 0.1 g of 1-phenyl-5-mercapto-1,2,3,4-tetrazole were then added to the homogeneous solution. The solution was then made up with water to 1000 ml (pH 13.8). The pH-value is reduced in degrees of 0.1 by additions of 5 ml of glacial acetic acid.

CR-compound 1 and compound ED 14 produce a positive dye transfer of high color brilliance.

In the same way dye transfer images were prepared from other CR-compounds. The color densities (Dmin and Dmax) are listed in the following table.

| | | Color density after | | | |
|---|---|---|---|---|---|
| | | 1 min | | 4 min | |
| CR-compound | color | $D_{min}$ | $D_{max}$ | $D_{min}$ | $D_{max}$ |
| 1 | cyan | | | 0,10 | 0,72 |
| 3 | magenta | 0 | 0,72 | 0,02 | 1,10 |
| 4 | cyan | 0,08 | 1,54 | 0,08 | 1,86 |
| 5 | magenta | | | 0,05 | 0,60 |
| 6 | cyan | 0,12 | 0,98 | 0,22 | 1,48 |
| 11 | cyan | 0,08 | 1,4 | 0,16 | 1,76 |
| 12 | yellow | 0,08 | 0,56 | 0,10 | 0,76 |
| 14 | cyan | 0 | 0,96 | 0,04 | 1,2 |
| 15 | cyan | 0,06 | 1,44 | 0,14 | 1,62 |
| 16 | magenta | 0 | 0,30 | 0 | 0,44 |
| 19 | cyan | 0,04 | 0,42 | 0,06 | 0,70 |
| 21 | cyan | 0,14 | 1,22 | 0,26 | 1,72 |
| 24(*) | cyan | 0,24 | 1,06 | 0,38 | 1,26 |
| 25 | cyan | 0,04 | 1,20 | 0,10 | 1,62 |

(*)CR-compound 24 does not contain a ballasting group (color fog!)

A transfer of the same color density is also obtained when the test material is stored before development in a heating cabinet (3 d, 57° C., 5% relative humidity) or tropical cabinet (7 d, 35° C., 85% relative humidity).

We claim:

1. In a photographic recording material containing at least one photosensitive silver halide emulsion layer with an alkali-permeable binder and a non-diffusing reducible compound which is in effective contact therewith and which contains a photographically active group, this reducible compound being capable of reductive cleavage thereby to split off the photographically active group as a diffusible compound under the alkaline development conditions, the improvement according to which the non-diffusing reducible compound is a sulfilimine compound corresponding to the following formula:

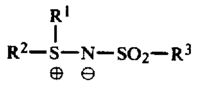

(I)

in which $R^1$ and $R^2$ represent the same or different aryl radicals at least one of these aryl radicals carrying an electron-attracting substituent in a position ortho or para and at least one of these aryl substituents carrying a ballasting group; and $R^3$ represents the residue of a diffusible photographically active compound.

2. A photographic recording material as claimed in claim 1, in which the non-diffusing reducible corresponds to the following formula II

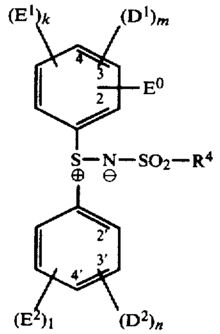

II in which $E^0$ represents $-NO_2$ in 2- or 4-position $E^1$, $E^2$ represent electron withdrawing subsituents in positions 2 or 4 (for $E^1$) and 2' or 4' (for $E^2$);

$D^1$, $D^2$ represent radicals conferring resistance to diffusion;

$R^4$ represents the radical of a diffusible dye or dye precursor;

k, l, m, n, each are 0 or 1; $m+n \geq 1$.

3. A photographic recording material as claimed in claim 2 in which each of $E^1$ and $E^2$ is selected from the group consisting of $-NO_2$, $-CF_3$, $-CN$, $-SO_2CF_3$, carbalkoxy, alkyl sulfonyl, sulfamoyl and carbamoyl.

4. A photographic recording material as claimed in claim 1 comprising at least three photosensitive silver halide emulsion layers which are sensitive to different thirds of the visible spectrum and associated to each of these photo sensitive silver halide emulsion layers a non-diffusing reducible compound, in which at least one of the non-diffusing reducible compounds is a color providing sulfilimine compound that by reductive cleavage under alkaline conditions splits off a diffusible dye or dye precursor.

5. A photographic material as claimed in claim 1, in which the silver halide emulsion layers contain negative silver halide emulsions.

6. A photographic material as claimed in claim 1, in which an electron donor compound or electron donor precursor compound is present in effective contact with the non-diffusing reducible compound.

7. A photographic material as claimed in claim 6, in which the electron donor precursor compound is a 5-membered or 6-membered α-lactone of a phenol which contains a hydroxyl group or an amino group in the 2-position or 4-position to the lactonized phenolic hydroxyl group, and an electron-attracting substituent in the lactone ring which facilitates cleavage of the lactone ring at pH-values of from 10 to 13.

8. A photographic material as claimed in claim 7, in which the electron donor precursor compound is a benzofuranone derivative corresponding to the following general formula:

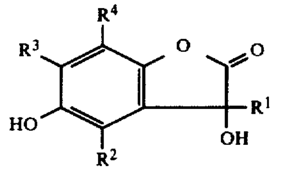

in which $R^1$ represents a carbocyclic or heterocyclic aromatic group, $R^2$, $R^3$,$R^4$ which may be the same or different, represent hydrogen, alkyl, alkenyl, aryl, alkoxy, alkylthio, amino or $R^3$ and $R^4$ may together complete a fused carbocyclic ring, at least one of the substituents $R^1$, $R^2$, $R^3$ and $R^4$ containing a diffusion-impeding ballast group with from 10 to 22 carbon atoms.

9. A material as claimed in claim 8, in which the non-diffusible reducible color providing compound and the ED-precursor compound, dissolved in an oil former, are present in heterodisperse form.

10. A material as claimed in claim 9, in which the non-diffusible reducible color providing compound and the ED-precursor compound, dissolved together in a common oil former, are present in heterodisperse form.

11. A material as claimed in claim 1, which contains a hydroquinone derivative, a 1-aryl-3-pyrazolidone, a pyrogallol derivative or ascorbic acid as silver halide developer in at least one of its layers.

12. A photographic recording material as claimed in claim 1, characterized in that it is made up as an integral instant color photographic unit comprising in the following order at least (a) a photosensitive element containing at least one photosensitive silver halide emulsion layer and associated thereto a non-diffusing reducible color providing sulfilimine compound (b) an alkali permeable opaque light reflecting layer, and (c) an image receiving layer.

13. A photographic recording material as claimed in claim 6, in which the ED-compound is present in from 1 to 5 times the molar quantity of the non-diffusing reducible sulfilimine compound.

* * * * *